United States Patent

Kuromoto et al.

[11] 3,940,779
[45] Feb. 24, 1976

[54] INTERCHANGEABLE FINDER TYPE CAMERA

[75] Inventors: Yoshio Kuromoto, Toyonaka; Toshio Kobori, Sakai; Masaru Ohba, Saki, all of Japan

[73] Assignee: Minolta Camera Kabushiki Kaisha, Osaka, Japan

[22] Filed: Mar. 27, 1974

[21] Appl. No.: 455,450

[30] Foreign Application Priority Data
Mar. 28, 1973  Japan.................. 48-35295

[52] U.S. Cl................... 354/224; 354/56
[51] Int. Cl.².............. G03B 13/00; G03B 7/00
[58] Field of Search ......... 354/155, 219, 224, 225, 354/56, 46

[56] References Cited
UNITED STATES PATENTS
3,733,984  5/1973  Yata ................. 354/56 X Primary Examiner—L. T. Hix
Assistant Examiner—E. M. O'Connor
Attorney, Agent, or Firm—Wolder & Gross

[57] ABSTRACT

A single lens reflex camera includes an interchangeable objective lens provided with a diaphragm adjusting ring having a drive element and an interchangeable view finder unit housing a light responsive exposure determining means including a follower movable with a varying parameter of the means between a retracted position and a resiliently urged advanced position. A blocking element is normally locked in a position projecting from the unit and preventing the mounting of the finder, and when the follower is released, the blocking element is retractable. The follower is locked in its retracted position and when the finder is mounted the follower is released for movement into operative engagement with the drive element.

11 Claims, 7 Drawing Figures

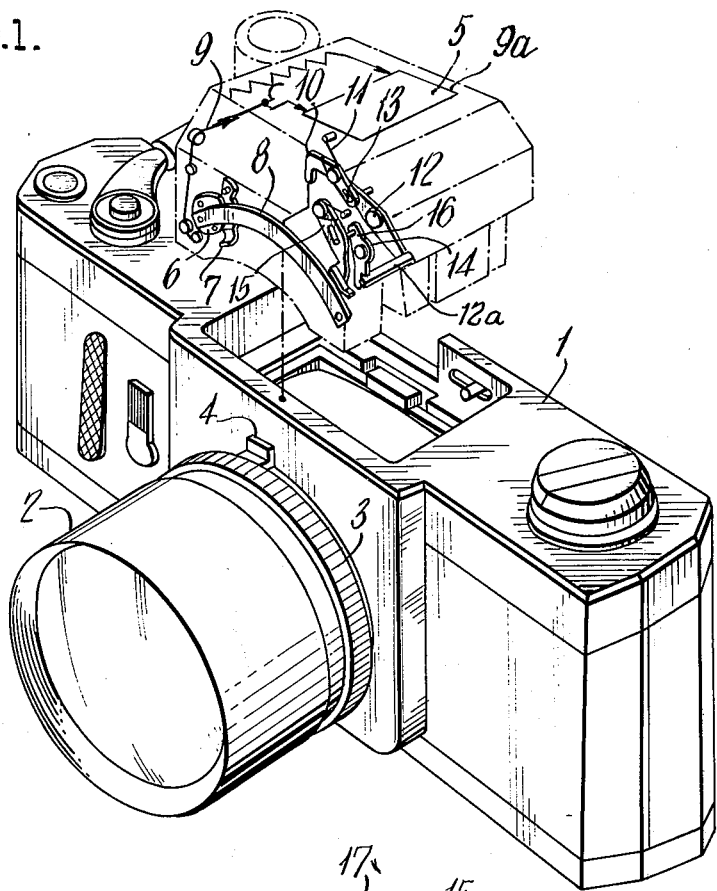
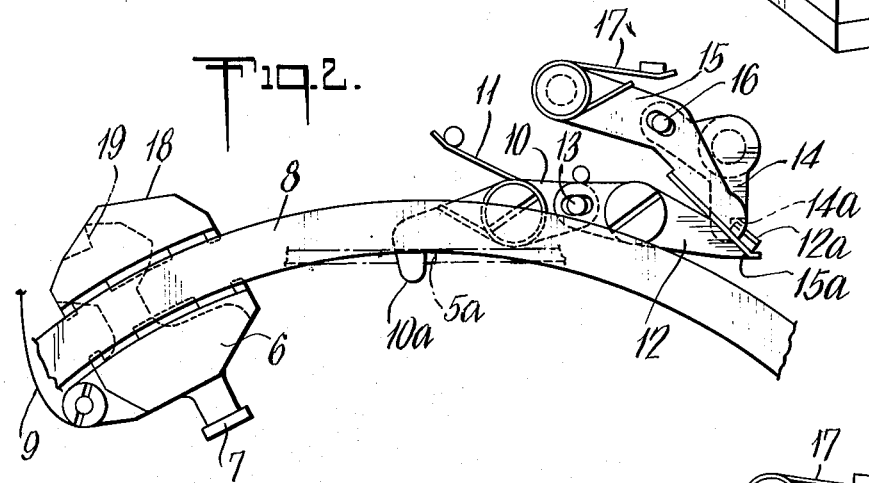
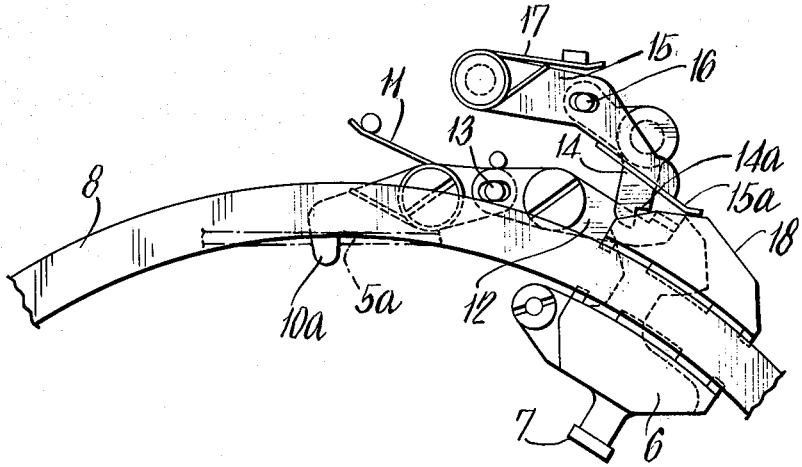

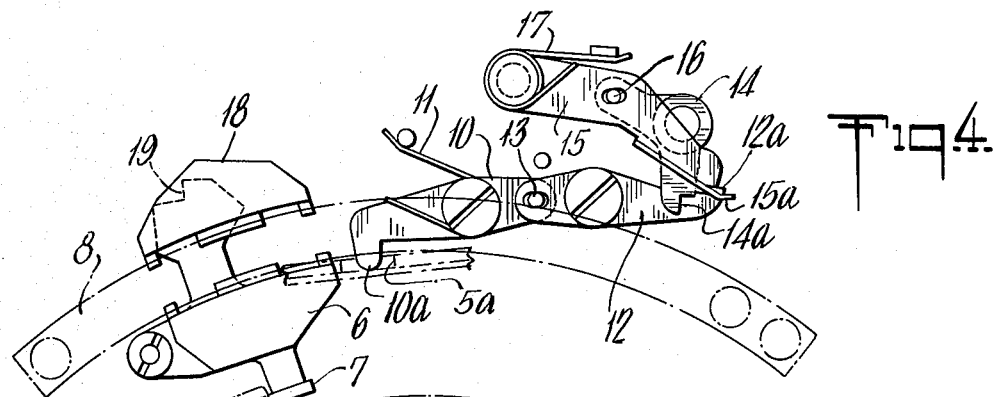
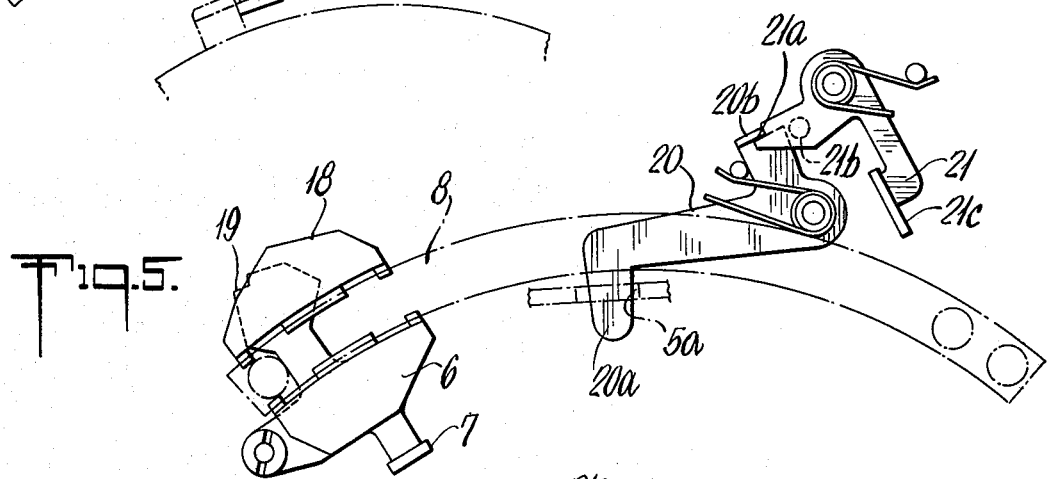
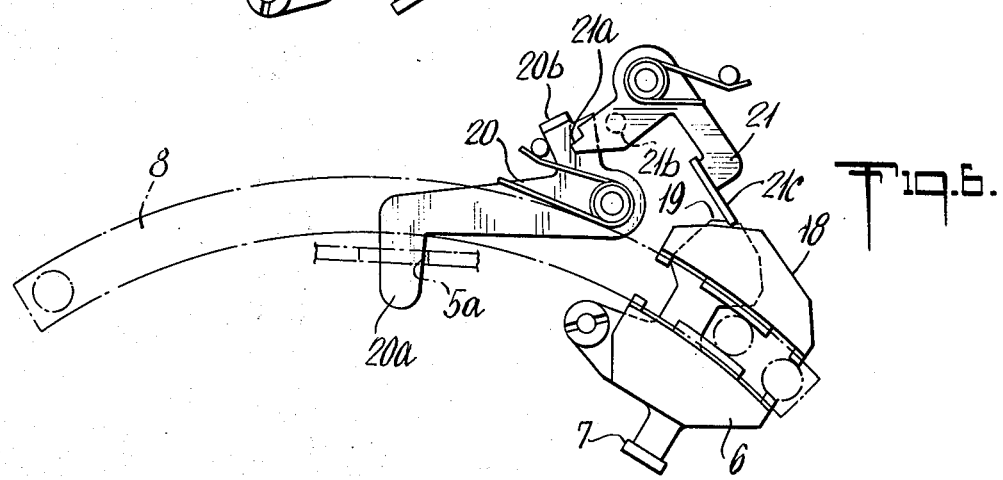
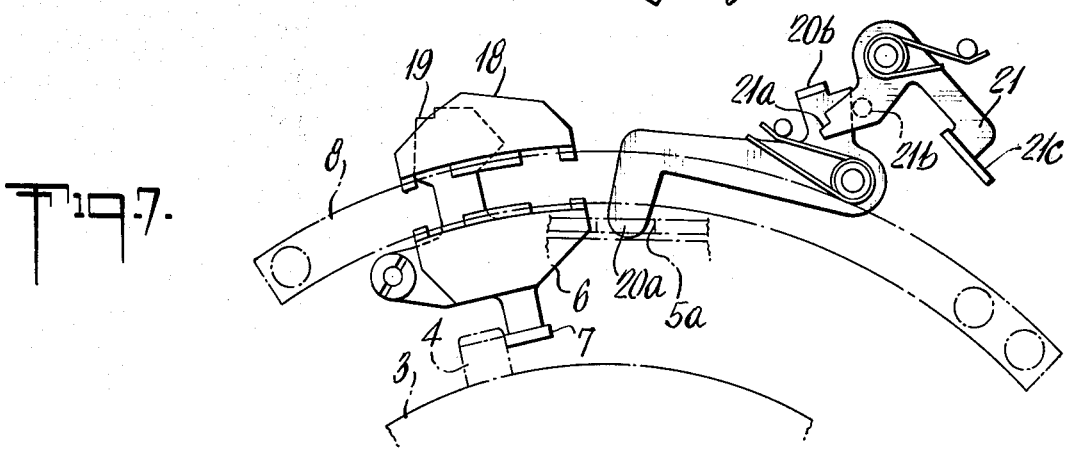

INTERCHANGEABLE FINDER TYPE CAMERA

BACKGROUND OF THE INVENTION

The present invention relates to an interchangeable finder type camera which is provided with an exposure coupling or interlocking device for transmitting diaphragm aperture information from the diaphragm ring of an interchangeable objective lens to an exposure control device provided in an interchangeable finder.

In general, in order to provide an exposure interlocking coupling in an interchangeable finder type camera, it is necessary that a drive coupling element of the diaphragm ring be positioned within the movable range of follower member of the interchangeable finder, which follower member is biased or urged to so move. However, since the recently developed exchangeable finder type camera is of such a construction that the interchangeable finder diaphragm ring follower is urged merely in one direction, such that if the interchangeable finder is mounted, with the interchangeable objective lens being mounted, then the drive coupling element of the aforesaid interchangeable lens will be positioned out of the movable range of the biased follower member of the finder, so that the finder follower member will not be brought into engagement with the drive coupling member of the diaphragm ring, thereby failing to effect an exposure interlocking state. Accordingly, it sometimes occurs that a photographer is under the mistaken impression that the exposure interlocking state has been effected in the camera, due to the fact that the interchangeable finder has been mounted thereon and he thus takes a picture under improper exposure conditions.

In addition to the above, complicated operations are required for achieving an exposure interlocking state, such as for instance, the interchangeable objective lens must be removed prior to mounting of the interchangeable finder, the finder being then mounted and thereafter the objective lens is mounted so as to position the drive coupling element of the interchangeable objective lens within the movable range of the follower member of the interchangeable finder which is urged in an advance direction.

SUMMARY OF THE INVENTION

The present invention is directed to avoid the aforesaid shortcomings which have been experienced with conventional cameras of this type.

It is accordingly a principal object of the present invention to provide an interchangeable finder type camera which is so designed that the failure to provide a proper exposure interlocking condition will result in blocking the mounting of an interchangeable finder and the mounting of the finder will necessarily lead to the creation of a proper exposure interlocking state.

It is a further object of the invention to provide an interchangeable finder type camera which permits ready mounting of an interchangeable finder on a camera according to a simple operation, with the interchangeable objective lens being mounted to the camera, thereby affording a proper exposure interlocking state.

According to one aspect of the present invention, in case the engaging pawl of the diaphragm ring of an interchangeable objective lens fails to properly relate to the engaging pawl of an interchangeable finder, a blocking member provided in a finder will prohibit or block the mounting of the finder to the camera body.

According to a further aspect of the present invention, the interchangeable finder may be readily mounted only by shifting the engaging member to a retracted position. In addition, the engaging member is locked in a predetermined retracted position, such that the positive mounting operation of a finder may be achieved, without the danger of the finder being dropped and damaged at the time of mounting.

According to a still further aspect of the invention, when the finder is mounted, an interlocking member is released from an engaging relation, simultaneously with the aforesaid mounting, thus ensuring a positive exposure interlocking relation.

BRIEF DESCRIPTION OF THE DRAWINGS

FIG. 1 is a perspective view of a camera embodying the present invention shown partially fragmented and with the finder section in an uncoupled condition;

FIG. 2 is an enlarged front elevational view of the mounting blocking mechanism thereof; illustrated in a condition blocking the mounting of the finder.

FIG. 3 is a view similar to FIG. 2 illustrated in a position permitting the mounting of the finder;

FIG. 4 is a view similar to FIG. 3 illustrated in a finder mounted and coupled condition:

FIG. 5 is a view similar to FIG. 2 of another embodiment of the present invention;

FIG. 6 is a view similar to FIG. 5 illustrated in a position permitting the mounting of the finder; and FIG. 7 is a view similar to FIG. 6 illustrated in a finder mounted and coupled condition.

DESCRIPTION OF THE PREFERRED EMBODIMENTS

Referring now to the drawings, particularly FIGS. 1 to 4 thereof which illustrate a preferred embodiment of the present invention, the reference numeral 1 generally designates a single lens reflex camera body which mounts an interchangeable objective lens 2 having a diaphragm adjusting ring 3 provided with a radially outwardly projecting first coupling member or engaging pawl 4. Associated with the camera is an interchangeable finder body 5 containing an automatic exposure control means 9a of known construction which includes a light measuring section.

An intercoupling or interlocking member 6 is provided within the finder body 5 and is shown enlarged in FIGS. 2 to 4, the interlocking member 6 being provided with an engaging pawl or second drive coupling member 7 adapted to engage the first drive coupling member or engaging pawl 4 of the diaphragm ring 3. In this respect, the interlocking member 6 is movable along an actuate guide member 8 and normally urged in one direction (to the left in the drawing) by means of a coupling string 9 connected to the exposure determining means. Accordingly, the engagement of the engaging pawl 4 of the diaphragm ring 3, from the left, with the engaging pawl 7 of the interlocking member 6 will effect an exposure interlocking condition between the members 4 and 7.

A swingably supported finder-mounting-blocking member or lever 10 has one end 10a projecting from an opening 5a located in the lower part of the finder 5 and is resiliently urged by a spring 11 in a counter-clockwise direction. A swingably supported lever or rotatable member 12 is provided at one end with a slot which slideably engages a pin 13 on an end of lever 10 thereby enabling its interlocking movement with the blocking member 10. The member 12 has a bent ear or portion 12a at the other end thereof.

A locking lever or member 14 is rockably supported and functions to releasably lock the blocking member 10 as well as the rotatable member 12 from rotation. Formed in the locking member 14 at one end is a notched portion 14a which is releasably engageable with the bent portion 12a of the rotatable member 12. A lock releasing member 15 is swingably supported at an end thereof and has a slot at its free end which is slidably engaged by a pin 16 mounted on lever 14 to drive couple members 14 and 15, the lever member 15 terminating in an inclined end portion 15a. A spring 17 urges the member 15 in a clockwise direction. An inclined upper surface 18 is formed on the interlocking member 6, and is adapted to operate the locking-releasing member 15. A notched portion 19 is formed in the upper surface of the interlocking member, and is engageable with the bent portion 12a of the rotatable member 12 to releasably lock the interlocking member 6, in its retracted position as shown in FIG. 3.

A depending finger 10a at one end of the finder-mounting-blocking member 10 projects externally through the opening 5a in the finder 5 and is releasably locked in such position by way of the interconnected blocking member 10 and swingable member 12 and the bent ear portion 12a of the rotatable member 12 engaging the notched portion 14a in the locking member 14. As a result, as shown in FIG. 2, even if it is attempted to mount the finder 5 on camera body 1, with the interlocking member 6 in the finder 5 being positioned to the left, the finder 5 will be blocked from being so mounted, because the depending finger end 10a of the blocking member 10 projects externally from the opening in the finder 5. More particularly, if the finder were to be mounted, with the interlocking member 6 being positioned to the left, the engaging pawl 4 of the diaphragm ring 3 will be positioned to the right to the engaging pawl 7 of the interlocking member 6, thereby failing to effect a proper drive coupling between members 4 and 6 and exposure interlock, but this is prevented by end 10a of the blocking member 10 inhibiting and blocking the mounting of the finder 5.

In order to properly mount the finder 5, the interlocking member 6 is first manually, slideingly retracted to the right along the guide member 8, whereby the inclined upper surface 18 of the interlocking member 6 swings the locking-releasing member 15 in a counter-clockwise direction which, in turn, swings the locking member 14 in a clockwise direction, thereby releasing the rotatable member 12 and permitting the swinging thereof with the swinging of member 10.

The interlocking member 6, which has been manually slidingly retracted, is releasably locked at its right position on the guide member 8 against the advance urging force of the interlocking string 9, because the bent portion 12a of the swingable member 12 engages the notched portion 19 provided on the interlocking member 6 (FIG. 3).

When the finder 5 is mounted after the aforesaid manual retraction and locking of member 6 and the rotatable member 12 is released from engagement and permitted to swing, the blocking member 10 is swung clockwise with the finger end 10a of the blocking member 10 being retracted within the opening 5a, whereby the finder may be properly mounted and coupled to the camera body positively and accurately. Moreover, since the member 12 is swung counter-clockwise with the clockwise rotation of the blocking member 10, the bent portion 12a, which has locked the retracted member 6 from returning to its home position, is shifted from the notched portion 19 in the interlocking member 6. As a result, upon the mounting of the finder in position, the interlocking member 6 is released and advanced to its home position, thereby engaging the engaging pawl 4 of the diaphragm ring 3 to effect the exposure interlocking state (FIG. 4).

In FIGS. 5 to 7 of the drawings there is illustrated another embodiment of the present invention which differs from that first described, primarily in that an integrally formed bell crank lever 21 is substituted for members 14 and 15 and an integrally formed lever member 20 is substituted for members 10 and 12, the mechanisms being otherwise similar. The lever member 20 is provided at one end with a depending finger 20a which corresponds to finger 10a and projects through finder bottom opening 5a and is provided at its opposite end with a bent portion 20b. In addition one arm of the locking member 21 is provided with a projecting pin 21b disposed rearwardly of a notched portion 21a at the end thereof which is engageable with a bent portion 20b of the blocking member 20, while the other end thereof is formed with a bent portion 21c which is engageable with the notched portion 19 provided in the interlocking member 6.

Thus, when the interlocking member 6 is positioned to the left, as shown in FIG. 5, if it is attempted to mount the finder 5 in this condition, then the finger 20a of the blocking member 20 which is maintained projecting externally, because the blocking member 20 is locked by means of locking member 21, such mounting of the finder 5 is blocked (FIG. 5).

To properly mount the finder 5, the interlocking member 6 is manually slidingly retracted to the right and the inclined upper surface 18 of the interlocking member 6 swings the locking member 21 in a counter-clockwise direction against the urging force of an associated spring such that the notched portion 21a in the interlocking member 21 is disengaged from the bent portion 20b of the blocking member 20, whereby the blocking member 20 is released to a swingable state, thus permitting the raising of finger 20a and the mounting of finder 5. The interlocking member 6, which has been slidingly retracted, remains positioned to the right with respect to the guide member 8, because the bent portion 21c of the locking member is on engagement with the notched portion 19 in the interlocking member 6 (FIG. 6).

When the finder 5 is mounted after the aforesaid manual operation, the blocking member 20 swings clockwise against the string urging force, with the raising the finger 20a of the blocking member 20 through the opening 5a and the finder 5 is properly coupled and mounted in position on the camera body. Furthermore, the clockwise rotation of the blocking member 20 causes the blocking member 20 to engage pin 21b of the locking member 21, thereby rotating the locking member 21 in a counter-clockwise direction. As a result, the bent portion 21c is disengaged from the notched portion 19, and the interlocking member 6 is released, returns to its home position to thereby engage the engaging pawl 4 of the diaphragm ring 3, with the result that the exposure interlocking state is achieved (FIG. 7).

While there have been described and illustrated preferred embodiments of the present invention, it is apparent that numerous alterations, omissions and additions may be made without departing from the spirit thereof.

We claim:

1. An exchangeable viewfinder type single lens reflex camera comprising:
    a camera body;
    an objective lens exchangeably mountable on said camera body and having a rotatable diaphragm ring;
    a viewfinder housing exchangeably mountable on said camera body, including,
    an exposure control device,
    an interlocking member movable between a first position preventing the transmission of diaphragm information from said diaphragm ring to said exposure control device and a second position for allowing such transmission; and
    blocking means movable between a first position for preventing the mounting of said viewfinder housing on said camera body when said interlocking member is in said first position and a second position for allowing such mounting only when said interlocking member is in said second position.

2. The camera as set forth in claim 1 further comprising a locking member movable between a first position for locking said blocking means in said first position when said interlocking member is in said first position and a second position for releasing said blocking only when said interlocking member is in said second position.

3. The camera as set forth in claim 2, comprising stopping means movable with said blocking means engageable with said interlocking member for stopping said interlocking member at said second position thereof.

4. The camera as set forth in claim 3 wherein said stopping means includes a projected portion located on said blocking means and a notched portion located on said interlocking member and said projected portion being engageable with said notched portion.

5. The camera as set forth in claim 3 wherein said stopping means includes a projected portion movable with said blocking means and a notched portion located on said interlocking member and said projected portion being engageable with said notched portion.

6. The camera as set forth in claim 2, said locking member having a stopping means engageable with said interlocking member for stopping said interlocking member at said second position thereof.

7. The camera as set forth in claim 2, said interlocking member having an actuating means contactable with said locking member for moving said locking member to said second position thereof only when said interlocking member is in its second position.

8. The camera as set forth in claim 7 wherein said actuating means includes an inclined portion located on said interlocking member.

9. A single lens reflex camera comprising a camera body, an objective lens mounted on the camera body and including an adjustable diaphragm and a first coupling member movable with the adjustment of said diaphragm, a finder housing separably mountable to the camera body and containing an adjustable exposure determining means, a second coupling member movable with the adjustment of said means between a first position inhibiting operative engagement between said coupling members and a second position permitting such engagement, and means responsive to said first and second positions of said second coupling member for respectively blocking and permitting the operative mounting of said finder housing to said camera body.

10. In combination with a single lens reflex camera including an objective lens with an adjustable diaphragm and a drive element movable with the adjustment of the diaphragm, a finder unit separably mounted on said camera said finder unit comprising an exposure determining mechanism, a follower engageable with said drive element and movable between a retracted position inhibiting the transmission of diaphragm information from said diaphragm to said exposure determining mechanism and an advanced position permitting such transmission, and means responsive to said retracted and advanced positions of said follower for respectively permitting and blocking the mounting of said finder unit to said camera.

11. The finder unit of claim 10 including means for locking said follower in its retracted position and responsive to the mounting of said finder unit to said camera for releasing said follower.

* * * * *